United States Patent
Durmek

(10) Patent No.: US 9,916,815 B2
(45) Date of Patent: Mar. 13, 2018

(54) ENHANCED SYSTEM AND METHOD FOR PRESENTING A VIEW OF A VIRTUAL SPACE TO A USER BASED ON A POSITION OF A DISPLAY

(71) Applicant: Disney Enterprises, Inc., Burbank, CA (US)

(72) Inventor: Stefan Durmek, Petrovice u Sedclan (CZ)

(73) Assignee: Disney Enterprises, Inc., Burbank, CA (US)

( * ) Notice: Subject to any disclaimer, the term of this patent is extended or adjusted under 35 U.S.C. 154(b) by 327 days.

(21) Appl. No.: 13/764,662

(22) Filed: Feb. 11, 2013

(65) Prior Publication Data

US 2014/0225930 A1    Aug. 14, 2014

(51) Int. Cl.
G09G 5/00 (2006.01)
G09G 5/36 (2006.01)
G06F 3/14 (2006.01)

(52) U.S. Cl.
CPC ............... G09G 5/363 (2013.01); G06F 3/14 (2013.01); G09G 2340/0464 (2013.01); G09G 2340/0492 (2013.01); G09G 2360/08 (2013.01); G09G 2370/022 (2013.01)

(58) Field of Classification Search
CPC .............................. G06T 15/20; G06T 19/003
See application file for complete search history.

(56) References Cited

U.S. PATENT DOCUMENTS

2011/0053691 A1* 3/2011 Bryant ................... A63F 13/24
463/37

2012/0026166 A1* 2/2012 Takeda et al. ............... 345/419

OTHER PUBLICATIONS

"Real Racing" published by Electronic Arts, on Jun. 8, 2009. https://itunes.apple.com/us/app/real-racing/id318366258.*
Macworld, "Real Racing" description, Nov. 3, 2012. page 1-2. http://www.macworld.com/product/100539/real-racing.html.*
Chris Holt, "Firemint Real Racing for iPhone", Jun. 22, 2009. p. 6. https://web.archive.org/web/20130402142654/http://www.macworld.com/article/1141246/firemint.html.*
JordanHumble, "Need for Speed Most Wanted Android Gameplay HTC One X Hands on Review EA", published on Youtube on Nov. 4, 2012. 3:10~4:40 and 4:55~5:15. https://www.youtube.com/watch?v=Y3lfRl71LOQ.*

* cited by examiner

*Primary Examiner* — Xiao Wu
*Assistant Examiner* — Chong Wu
(74) *Attorney, Agent, or Firm* — Sheppard Mullin Richter & Hampton LLP

(57) ABSTRACT

An enhanced system and method presents a view of a virtual space on a display based on a position of the display in one or more degrees of freedom. For such a position of the display, a corresponding field of view in the virtual space may be determined. In some examples, as the display rotates about an axis that runs perpendicular to the display through a centroid of the display, the view of the virtual space may shift such that the field of view varies dynamically with the rotational position of the display and the objects in the field of view are maintained fixed in the virtual space. In some implementations, an object of the virtual space may be controlled by the position change of the display in the degrees of freedom such that the objects may be steered according to the display's position in the degrees of freedom.

16 Claims, 6 Drawing Sheets

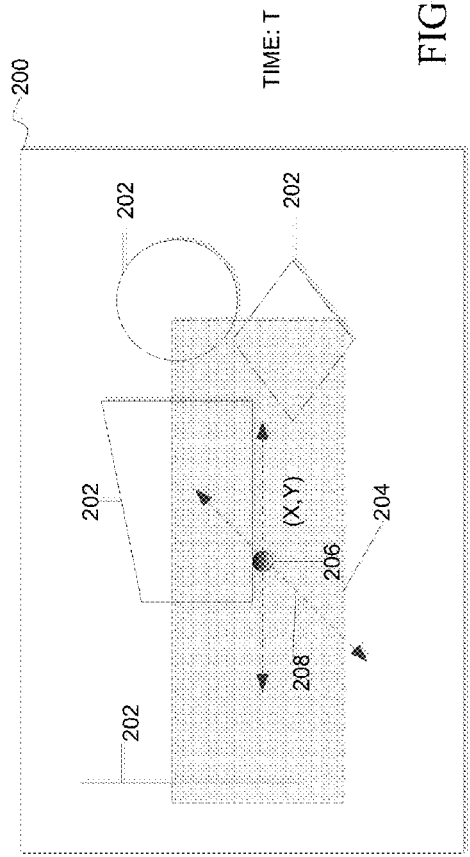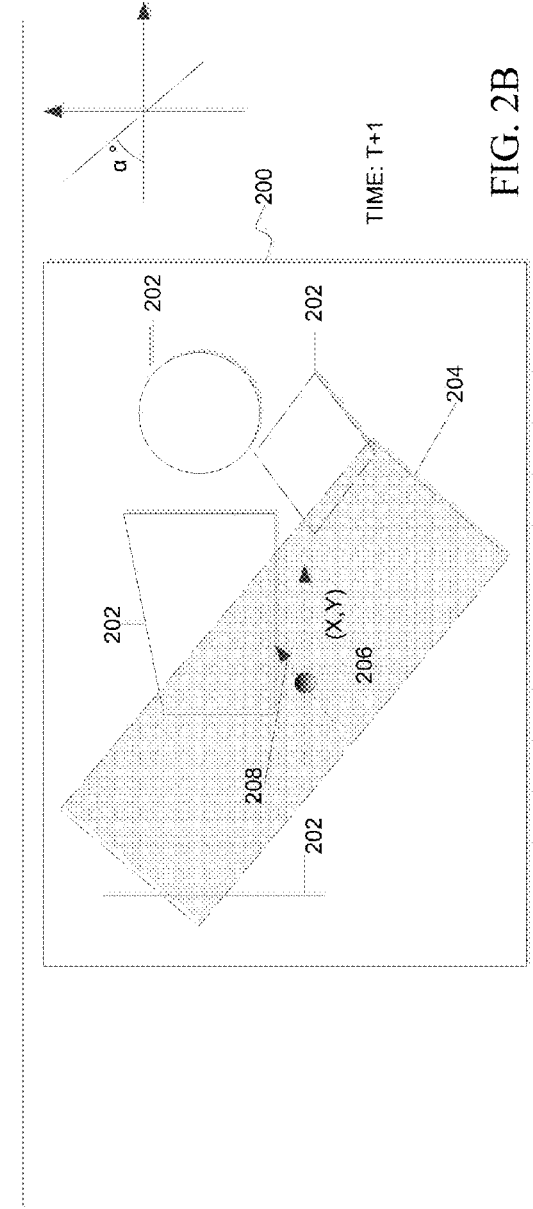

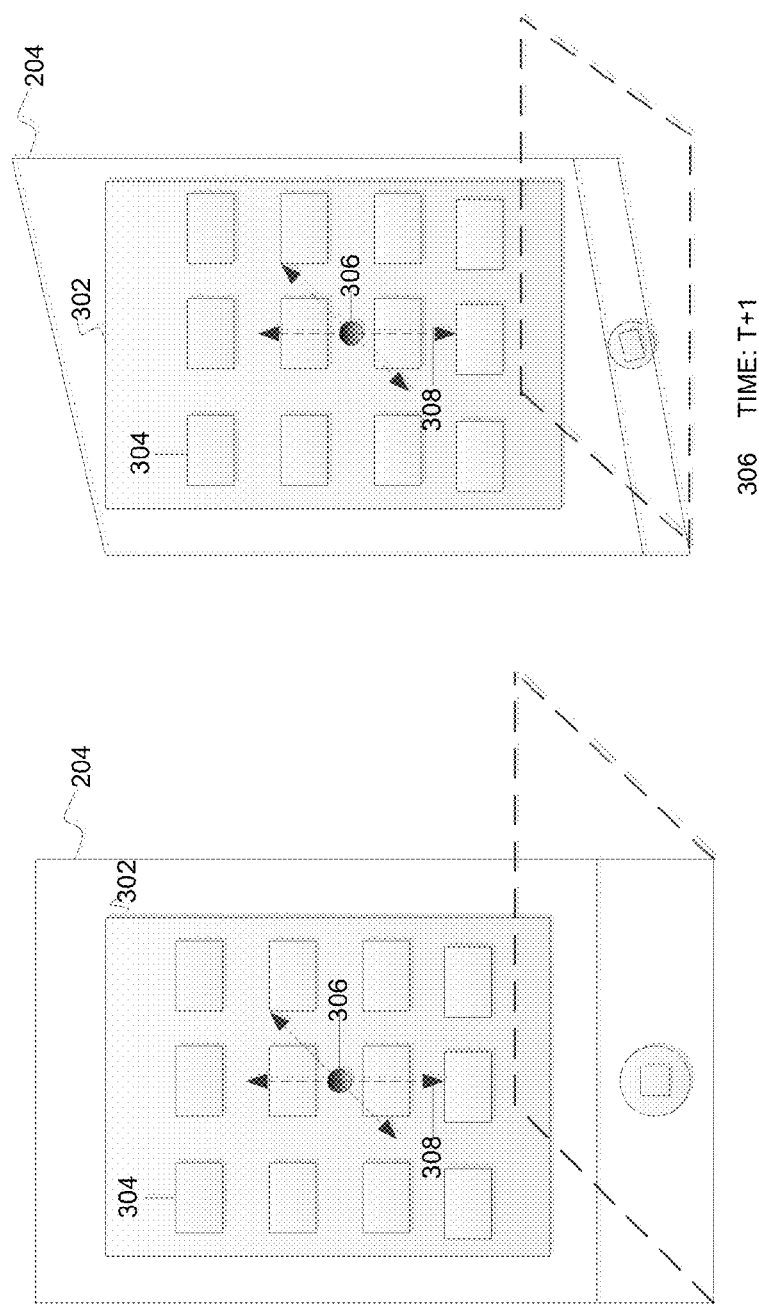
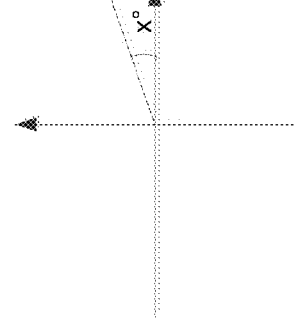
FIG. 3B
FIG. 3A

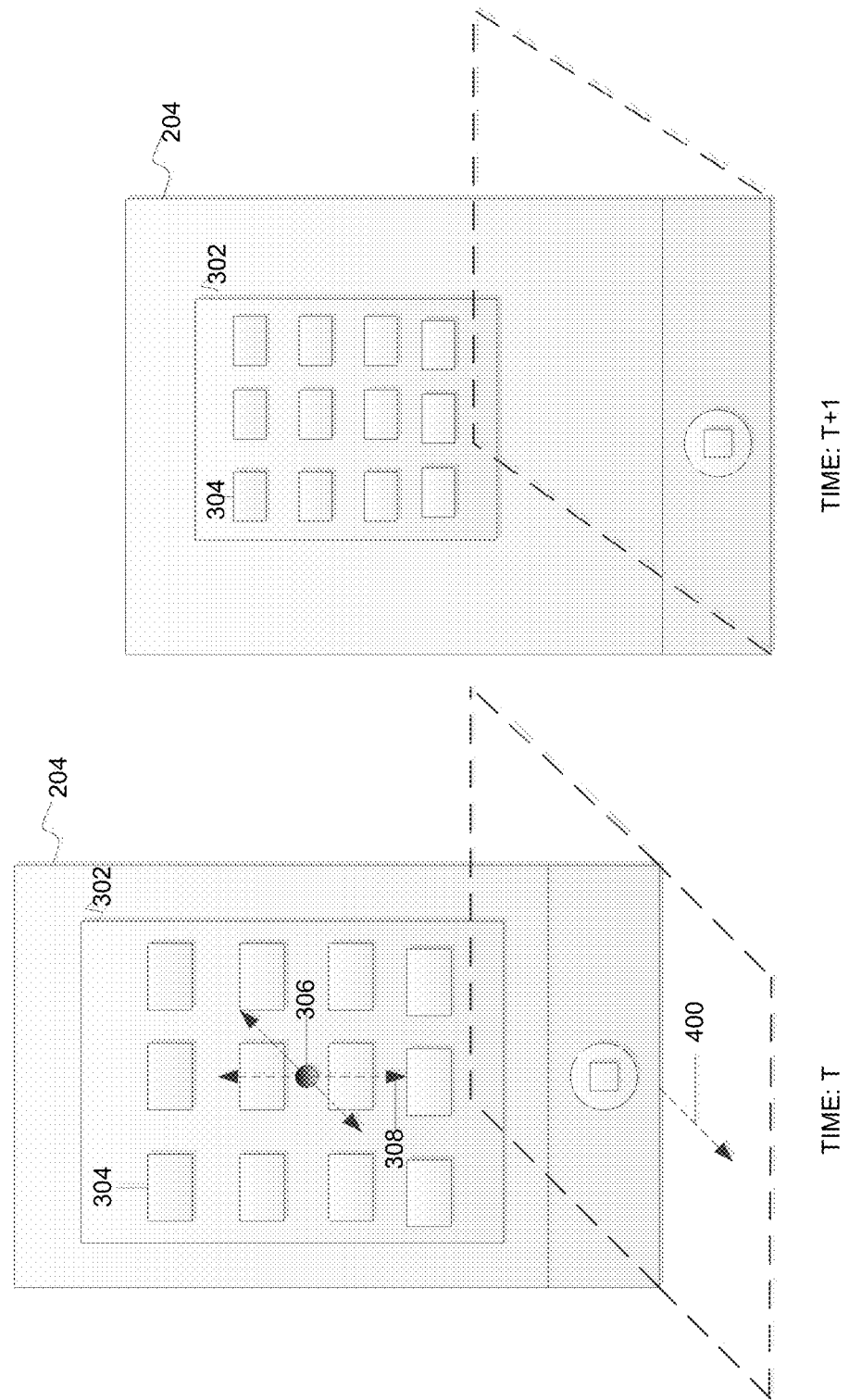

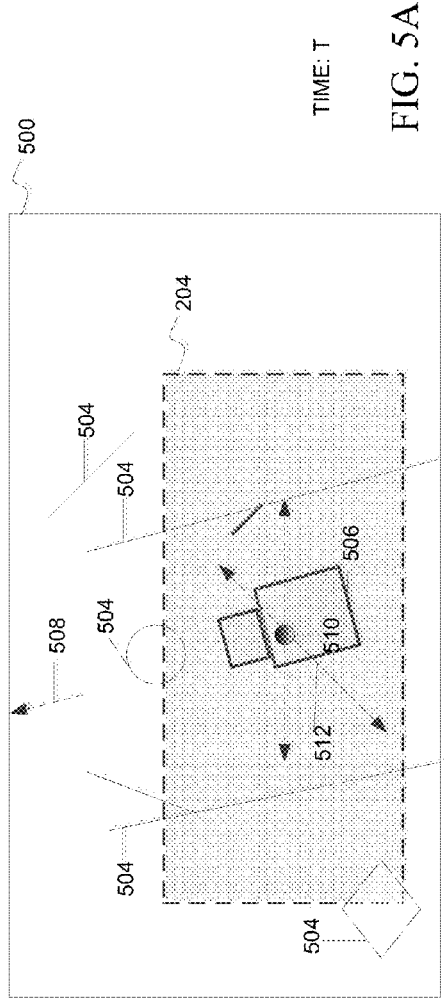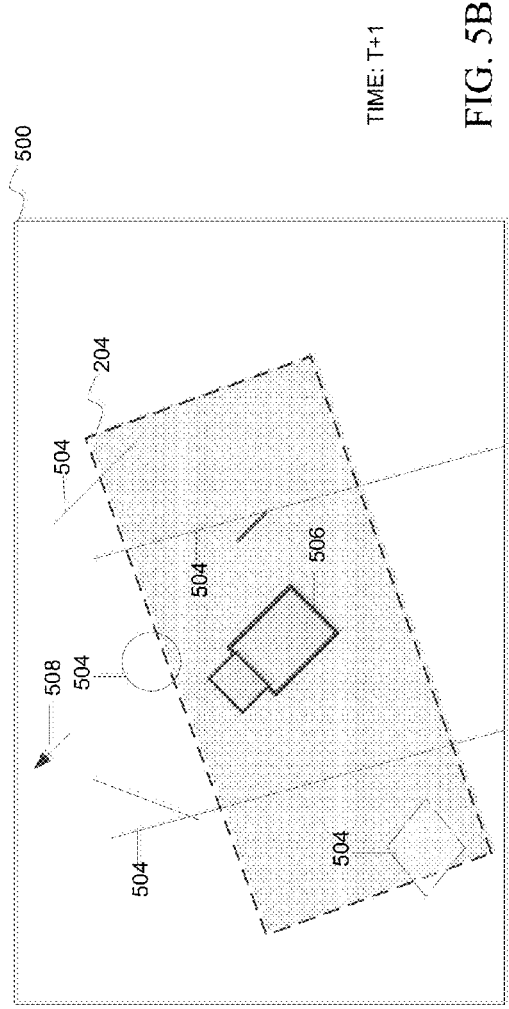

ENHANCED SYSTEM AND METHOD FOR PRESENTING A VIEW OF A VIRTUAL SPACE TO A USER BASED ON A POSITION OF A DISPLAY

FIELD OF THE DISCLOSURE

This disclosure relates to an enhanced system, and method for presenting a view of a virtual space to a user such that the view of the virtual space varies dynamically with the position of the display while the objects in the virtual space are maintained fixed in the view.

BACKGROUND

Systems and methods that present objects in a virtual space in landscape mode or portrait mode with respect to gravity are known. For example, a smartphone may present objects in a virtual space in a portrait mode, i.e. in upright positions when the smart phone is positioned in one orientation, and may display the objects in a landscape mode when the smartphone is positioned in another orientation.

In some games played on mobile devices, an object in a virtual space can be controlled based on a position of the display. For example, in a racing game on a smartphone implemented with the enhanced technique, a user controlled car can be steered around in different directions in the race track as the user tilts the smartphone. In these games, as the smartphone rotates, the objects in the virtual space, e.g. the race track and the race car, also tend to rotate with the smartphone such that their orientations with respect to the user also change along with the smartphone's orientation changes.

SUMMARY

One aspect of the disclosure relates to a system configured to present a view of a virtual space that varies with position of a display. For example, the field of view may shift in the virtual space to reflect a rotational position of the display about an axis through a centroid of the display that runs perpendicular to the display. As so presented, the view presented through the field of view may comprise objects in the virtual space. The relative positions of the objects in the virtual space may be maintained fixed or relatively fixed as the display is rotated, while the position of the field of view rotates in the virtual space in a manner that simulates rotation of the display about the axis in the real world. As such, unlike the conventional virtual space presentation techniques, the system may present a view of the virtual space in other than the portrait or landscape mode when the system rotates about the axis. This may enhance a user's experience in interacting with the virtual space, as the virtual space appears more anchored to the real world, while the portal into the virtual space provided by the field of view rotates in manner that corresponds to rotation of the display in the real world.

In some implementations, a system configured to present a view of a virtual space based on a position of a display may include one or more processors configured to execute one or more computer program modules. The one or more computer program modules may include one or more of a space module, a display position module, a field of view determination module, an object control module, and/or other modules.

The display position module may be configured to determine position information related to a position of the display in one or more degrees of freedom. Such information may include, for example, information indicating relative position in one or more rotational degrees of freedom and/or one or more translational degrees of freedom. The one or more degrees of freedom in which position of the display is determined may be referred to herein as the degree(s) of freedom of interest. In some implementations, the degree(s) of freedom of interest may include and/or be limited to rotation about an axis extending perpendicular to a centroid of a display surface of the display, and/or other rotational degrees of freedom about a centroid of the display and/or the display surface. In some implementations, the display position module may be configured to receive information indicating the display's location, orientation, motion, displacement, acceleration and/or any other information related to the display's position. Such information may be generated by one or more sensors carried by a device associated with the display, and/or by other sensors. Such information may be used by the display position module to determine position information related to the position of the display in one or more degrees of freedom.

The field of view determination module may be configured to determine a field of view of the virtual space to be presented on the display based on position information related to a position of the display in the degree(s) of freedom of interest. The field of view may be determined based on position of the display in the degree(s) of freedom of interest such that as the display is moved in the degree(s) of freedom of interest in the real world, the field of view in the virtual space is shifted in a corresponding manner in the degree(s) of freedom of interest. This shifting of the field of view in the virtual space may simulate changes in the degree(s) of freedom of interest in the real world. In some examples, the field of view determination module may be configured to determine the field of view in the virtual space without regarding motion or position of the display in one or more degrees of freedom that are not of interest. For example, the field of view may be determined in some implementations without regard for motion or changes of position in any translational degree of freedom. In such examples, the field of view in the virtual space may remain unchanged as the display is moved in any translational degree of freedom, e.g. left and right. In some examples, the field of view determination module may be configured to center the field of view on an object in the field of view such that the object is focused in the field of view. In some examples, the field of view determination module may be configured to determine the field of view in the virtual base in real time or near real time such that the field of view shifting in the degree(s) of freedom of interest may form a motion in the virtual space that is presented on the display.

The space module may be configured to provide a virtual space by executing an instance of the virtual space, and implementing the instance of the virtual space to determine a view of the virtual space for presentation on the display. The space module may be configured to determine the view of the virtual space based on the field of view corresponding to the display's position in the degree(s) of freedom of interest. The view of the virtual space may be implemented using information indicating position, angle, orientation, portion, color, shape, size, texture, skin, physical characteristics, expressive features and/or any other suitable representation information about one or more objects in the field of view in the virtual space. As so presented, the objects in the virtual space may be maintained fixed or relatively fixed in the field of view as the display rotates in the degree(s) of freedom of interest. In some implementations, the space modules may be configured to maintain relative positions between objects in the virtual space unchanged when the field of view changes along with the display in rotational degree(s) of freedom of interest.

The object control module may be configured to selectively control an object in the virtual space based on the display position of the display. Such a control may include controlling the direction, orientation, size, height, shape and/or any suitable characteristics of the objects within the virtual space. In some examples, the controlled object may include a character associated with a user, for example, an avatar.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein:

FIG. 2A illustrates one example of presenting a view of the virtual space when a display is positioned at zero degree rotational position about an axis perpendicular to the display;

FIG. 2B illustrates one example of presenting a view of the virtual space when the display shown in FIG. 2A is positioned at an alpha degree rotational position about the axis perpendicular to the display;

FIG. 3A illustrates one example of presenting a view of the virtual space when a display is positioned upright with a zero rotational angle relative to an axis through a centroid of the display;

FIG. 3B illustrates one example of presenting a view of the virtual space when the display shown in FIG. 3A is positioned upright with an X degree rotational position with respect to the axis also shown in FIG. 3A;

FIG. 4A illustrates one example of presenting a view of the virtual space when a display is positioned upright with respect to a plane perpendicular to the display;

FIG. 4B illustrates one example of presenting a view of the virtual space when the display shown in FIG. 4A is moved forward with respect to the plane also shown in FIG. 4A;

FIG. 5A illustrates another example of presenting a view of the virtual space when a display is positioned at zero degree rotational position about an axis perpendicular to the display;

FIG. 5B illustrates an example of presenting a view of the virtual space when the display shown in FIG. 5A is positioned at an alpha degree rotational position about the axis perpendicular to the display;

DETAILED DESCRIPTION

Figure 1:
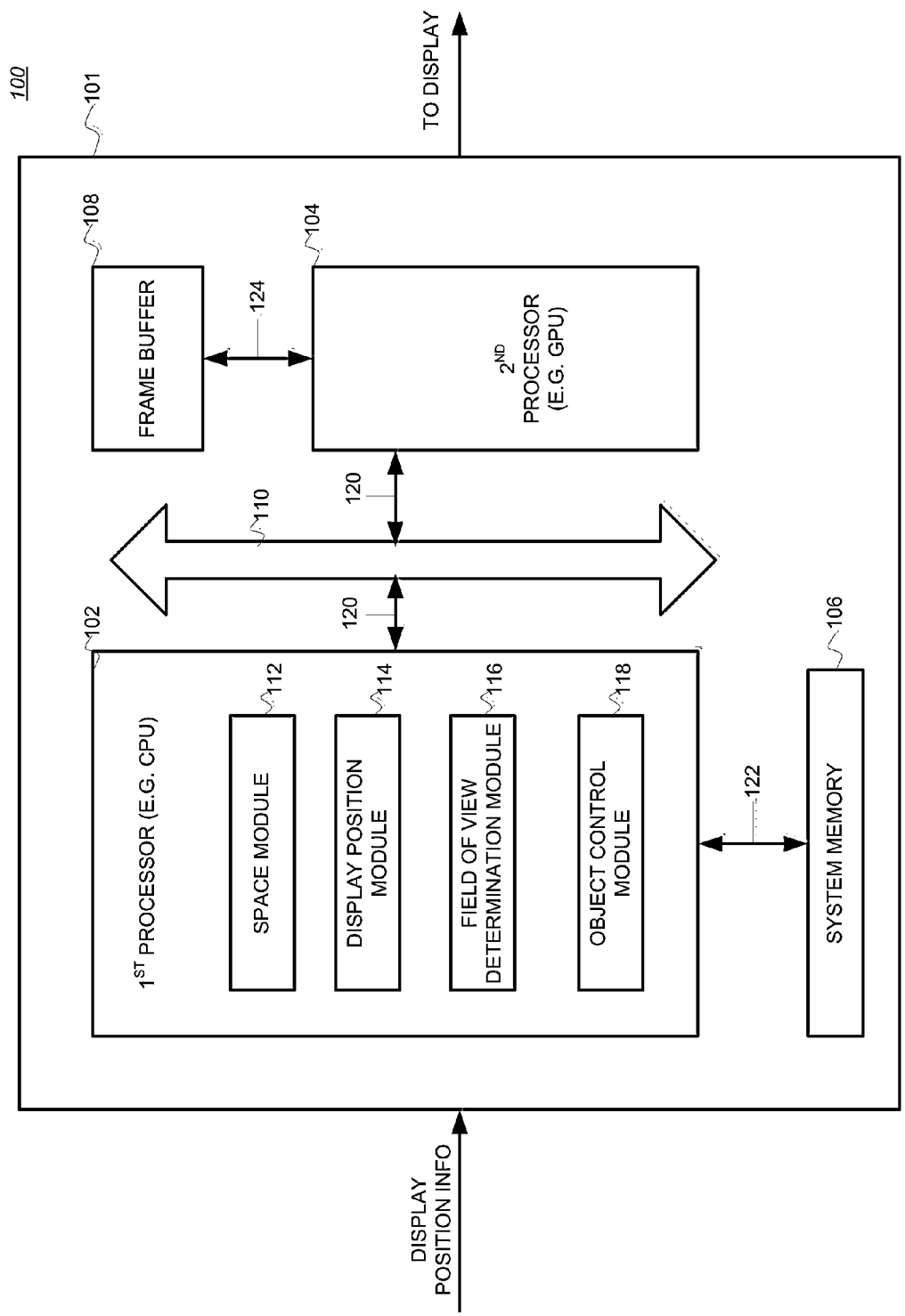
FIG. 1 illustrates one example of a system configured to present views of a virtual space in accordance with one embodiment of the disclosure.

FIG. 1 illustrates one example of a system 100 configured to present views of a virtual space to a user in accordance with one example of the disclosure. The system 100 may include any suitable device 101, for example, handheld device (e.g., mobile or smart phone, tablet, etc.), computer server, a laptop computer, desktop computer, media center, gaming console, set top box, printer or any other suitable device, to name a few. This includes virtualized resources and/or devices implemented "in the cloud." In this example, the device 101 employs a first processor 102 operatively connected to system memory 106 and a second processor 104 operatively connected to frame buffer 108. This is merely illustrative, as device 101 may be implemented with more or less processors than those shown. One or both of first processor 102 and/or second processor 104 may include a plurality of processing units operating in coordination in some other examples. As shown in this example, the first and second processors may be connected using a data bus or point to point connections, such the system bus 110, which transfers data between each structure of the system 100. Although not shown, the system 100 may also include an input device, such as but not limited to, touch screen, motion sensor, mouse, trackball, touchpad, digitizing tablet, joystick, pointing stick, keypad, keyboard, camera, remote controller or any other suitable input device. The system 100 may also include a display, which is also not shown in this example. The display may include touch screen, liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The display may be configured to receive inputs from a user, for example a touchscreen. One of ordinary skill in the art will recognize other suitable structure, such as but not limited to, a storage device, a memory controller, an i/o subsystem and/or any other structure may also be included in the system 100.

In some implementations, system 100 may include a server 101 employed in a client/server architecture that includes one or more of a server 101 and/or other components. In those implementations, server 101 may include communication lines, or ports to enable the exchange of information with a network and/or other computing platforms. The processor 102 included in the server 101 may be configured to execute computer program modules via one or more of hardware, software, and/or firmware. Although one server 101 is illustrated, it is understood that the number of servers 101 may vary in some other examples. In those examples, the modules executed, as shown in this example, by the first processor 102 may be distributed on the same and/or different servers 100. Users may interface with system 100 via a client device through one or more electronic communication links. For example, such electronic communication links may be established, at least in part, via a network such as the Internet and/or any other suitable wired or wireless communication links in the art. In those embodiments, the client device may include one or more processors configured to execute computer program modules. The computer program modules may be configured to enable one or more users associated with the given client computing platform to interface with system 100, and/or provide other functionality attributed herein to client device. By way of non-limiting examples, the given client computing platform may include one or more of a smartphone, a tablet, a desktop computer, a laptop computer, a handheld computer, a NetBook, and/or other computing platforms.

In this example, the first processor 102 may include a host central unit (CPU) having multiple cores however any suitable processor may be employed including a DSP, APU, GPGPU or any other suitable processor or logical circuitry. The first processor 102 may be bi-directionally connected to other components of the system 100 via the system bus. The second processor 104 may include a graphics processing unit (GPU), which drives the display device via a display connector, such as analog display connectors, for example, composite video, S-Video, VGA, digital display connectors, for example, HDMI, mini-DVI, micro-DVI, wireless connectors or any other suitable connectors. It is understood that, in some other examples of system 100, the first processor 102 may be integrated with the second processor 104 to form a general processor. In addition, although the system memory 106 and the frame buffer 108 are shown in FIG. 2 as two separate components in the system 100, it is also understood that a unified memory architecture that can accommodate all the processors may also be employed in some other examples of the system 100.

In this example, as shown, the first processor 102 may be configured to execute a space module 112, display position module 114, field of view determination module 116, and object control module 118. The "module" referred to herein is any suitable software module, hardware, firmware or any suitable combination thereof that can perform the desired function, such as programmed processors, discrete logic, for example, state machine, to name a few. It is further understood that these modules may be included in the first processor 102 as part of the first processor 102, or a discrete component of the system 100 that can be executed by the first processor 102, such as software programs stored on computer readable storage medium that can be loaded into the system 100 and executed by the first processor 102. It is still understood that these modules may be combined in some other examples to form an integrated module that performs the combined functions of these modules as described herein. It is still understood the number of modules may vary in some other examples such that, for example, more than one space modules 112 may be included in the first processor 102. These modules may communicate with structures in the system 100 such as but not limited to the system memory 106, the second processors 104 and the frame buffer 108 via any suitable communication link, such as the system bus 110.

Also shown in this example is the second processor 104, operatively connected to the frame buffer 124 via any suitable communication link. The second processor 104 in this example is a graphics processing unit (GPU) that may be configured to process graphics information for a display, which is not shown in this example. The second processor 104 may be configured to receive graphics information 120 from the first processor 102, e.g., from an output of space module 112. The second processor 104 may be configured to process graphics information to facilitate a presentation of the graphics information on the display. As shown, the second processor 104 may be connected to the frame buffer 108 for storing and retrieving information 124 to facilitate the processing of graphics information on the second processor 104.

As shown, the first processor 104 may be configured to execute the space module 112 configured to provide a virtual space by executing an instance of the virtual space, and implementing the instance of the virtual space to determine a view of the virtual space for presentation on a display. A virtual space may comprise a simulated space (e.g., a physical space) instanced on a computing device and/or server (e.g., system 100) that is accessible by a client. In some other examples, the computing device and client (e.g., a display) may be integrated to form a standalone device that provides the virtual space, such as a smart phone, tablet, laptop, handheld and/or any other standalone device. In any case, the simulated space may include a topography, express ongoing real-time interaction by the user, one or more AI characters, and/or one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

The space module 112 may be configured to determine a view having a field of view defined by the field of view determination module 116. A view of the virtual space may correspond to a location in the virtual space (e.g., the location in the virtual space from which the field of view is taken). Based on the field of view, the space module 112 may be configured to determine representation information about one or more objects in the virtual space. For example, if a field of view is taken at a location of the virtual space in a rotational position corresponding to the display's rotational position in the degree(s) of freedom of interest, the view of the virtual space may be determined to include representations of objects that are located within the area defined by the field of view in the virtual space at that location. The representations of the objects may be implemented by using information indicating positions, orientations, angles, portion, shape, size, color, texture, physical characteristics, expressive features, and/or any suitable representational information that may be used to represent these object as viewed in the field of view. As so presented, the view presented through the field of view may comprise representations of objects in the virtual space depending on the position of the field of view in the virtual space. The relative positions of the objects in the virtual space may be maintained fixed or relatively fixed as the display is rotated about an axis in a rotational direction for which the display has the degree of freedom, while the position of the field of view rotates in the virtual space in a manner that simulates rotation of the display about the axis in the real world. For example, in the case when display has a degree of freedom of interest for rotating about an axis through a centroid of the display that runs perpendicular to the display, different parts (or portions) of objects in the virtual space may be presented in the field of view as the field of view shifts along with the display's rotation about the axis. This is resulted because the field of view may correspond to a different location in the virtual space at a different rotational position of the display in the degree of freedom of interest and form a different portal into the virtual space as display rotates about the axis in the real world. As the field of view so varies, different parts of objects, e.g., trees, buildings, may be represented in the view, e.g., from top to bottom when they appear in the field of view, but their positions (e.g., the orientations) in the virtual space may be maintained unchanged. This may enhance a user's experience in interacting with the virtual space, as the virtual space appears more anchored to the real world, while the portal into the virtual space provided by the field of view rotates in manner that corresponds to rotation of the display in the real world.

In some implementations, to achieve this, the space module may be configured to determine an adjustment to compensate for the display's position change in the degree(s) of freedom of interest. For example, as the display rotates about a rotational axis perpendicular to the display through a centroid of the display by X degrees, the space module 112 may calculate an adjustment for the determination of the view to offset the display's rotation by −X degrees. As a result, different portions of objects and/or different objects in the virtual space may be presented in the view, but the positions of the objects in the virtual space may be maintained fixed or relatively fixed in the view.

The display position module 114 may be configured to determine position information related to a position of the display in one or more degrees of freedom of interest. As shown, the position information, for example indicating the display's location, orientation, acceleration, motion, displacement and the like may be received and/or generated by the system 100. For example, in some implementations, the system 100 may be a smartphone or a tablet that is equipped with or coupled to a GPS receiver, camera, gyroscope, accelerometer, compass, ambient light sensor, and/or any other suitable device. In those implementations, the system 100 may, through one or more of such a device, receive and/or generate information related to the position of the display. Based on such information, the display position module 114 may be configured to determine a position of the display in one or more degrees of freedom of interest. For example, based on an orientation of the display, position of the display indicating the display's rotation about an axis that runs perpendicular to the display through a centroid of the display may be determined, e.g., a value of X degrees rotation with respect to such an axis. In some examples, the display position module 114 may be configured to determine positions of the display in more than one degree(s) freedom of interest. For instance, the determined display position information by the display position module 114 may include information indicating the display's positions in two rotational degrees of freedom of interest and one translational degree of freedom of interest. Such display position information may define the display's position in a 3-D space, which may be used by the space module 112 to determine a view of the virtual space.

In some implementations, one or more of a degree of freedom for the display may be activated (i.e. the degree(s) of freedom of interest) dynamically to facilitate the display position determination. For example, a translational freedom of surging may be activated dynamically for the display such that a displacement may be determined as the display moves forward and backward along the axis that runs perpendicular to the display through a centroid of the display. In some implementations, the display position module 114 may be configured to determine display's position only in the degree(s) of freedom that are activated. For instance, in cases where only rotational degrees of freedom of interest are activated for the display, the display determination module 114 may not determine the display's position in any translational degree of freedom.

In some implementations, the display position determination module 114 may be configured to determine a display's position change in the degrees of freedom of interest. For example, in the case where the display rotates about the axis that runs perpendicular to the display through a centroid of the display, a rotational degree of change for the display, e.g., X degrees rotation about the axis may be determined.

The field of view determination module 116 may be configured to determine a field of view in the virtual space based on the information relating to the display's position in the degree(s) of freedom of interest, for example, as determined by the display determination module 114. A field of view in the virtual space may define an area around a location in the virtual space. For example, for a 2-D virtual space, a field of view may define an rectangular area of (x1, y1), (x2,y2), (x3,y3), (x4, y4) around a location (X,Y) in the virtual space, e.g., a centroid of the virtual space. For a 3-D virtual space, a field of view may also define a perspective through which the area of the virtual space within the field of view may be perceived. For example, through different perspectives, different sides of an object in the virtual space may be perceived from different viewing angles. The position of the field of view in the virtual space may be determined based on position of the display in the degree(s) of freedom of interest such that as the display is moved in the degree(s) of freedom of interest in the real world, the field of view in the virtual space is shifted in a corresponding manner in the degree(s) of freedom of interest. This shifting of the field of view in the virtual space may simulate changes in the degree(s) of freedom of interest in the real world. For example, in a 2-D virtual space, the field of view may be positioned in a rotational position about an axis that runs perpendicular to the 2-D virtual space through a location (X, Y) in the 2-D virtual space. Such a rotational position of the field of view may be determined to simulate the display's rotational position in the rotational degree of freedom about an axis through a centroid of the display that runs perpendicular to the display, e.g., by adopting the rotational position of the display in the rotational degree of freedom in the real world. The dimension of the field of view may be determined based on the dimension of the display, for example, the length, height, width, shape and/or any other suitable measurements regarding the display's dimension. For example, in the case where the display has a rectangular screen of 5.5 inches diagonal length measured from one corner of the screen to the opposite corner of the screen, an area of virtual space that matches such a size of the screen may be determined to be perceived in the field of view. In some implementations, for a 3-D virtual space, the field of view may also be determined to include a depth for which the area in the field of view may be perceived. In some implementations, the field of view determination module 114 may be configured to determine the field of view such that an object in the virtual space may be centered in the field of view. For example, in a virtual racing game world, the field of view may be determined such that a virtual race car, e.g., a virtual race car controlled by a user is centered in the field of view in the virtual racing game world.

Also shown in this example is an object control module 118 included in the first processor 102. The object control module 118 may be configured to selectively control an object in the virtual space based on the determined position of the display in the degree(s) of freedom of interest. For example, in the virtual racing game world, one or more virtual race cars may be controlled by the object module 118 such that the direction of the virtual race cars may be controlled by a user or users through rotating the display in the degree(s) of freedom of interest. In that example, to facilitate such a control, the object module 118 may be configured to calculate a corresponding direction change for the virtual race car based on the information relating to the display's position in the degree(s) of freedom of interest, for example, as determined by the display position module 114. An example of controlling objects in the virtual space in accordance with the disclosure will be illustrated in further details in FIG. 5.

In some implementations, the objects within the virtual space may also include one or more characters and the object control module 118 may be configured to control the movement of the characters. For example, an avatar is a type of character that may be controlled by an associated user to represent the user in the virtual space. In that example, the object control module 118 may be configured to control the movements, view perspective (e.g., looking right, left, up or down), and/or other suitable motion for an avatar in the virtual space based on the display position information.

FIGS. 2-5 illustrate various examples of using a system 100 as shown in FIG. 2 to present views of a virtual space to a user in accordance with the disclosure. They will be described with references to FIG. 1. FIGS. 2A-B illustrate one example of presenting views of the virtual space using the system 100. As shown in this example, a 2-D virtual space 200 may comprise several objects 202. The position information related to a display 204 may be detected, for example, by a position determination device included in or coupled to the system 100, such as but not limited to, a GPS receiver and/or a gyroscope. In this example, the position information may indicate the display's location and/or an orientation. As described above, the display position module 114 may be configured to determine the display's position in the degree(s) of freedom of interest. In this example, as illustrated, the display 204 has a rotational degree of freedom about the axis 208. In FIG. 2A, at time T, the display position module 114 may be configured to determine that the display 204 is positioned at a 0 degree rotational position about the axis 208. Based on this determined rotation position about the axis 208, the field of view determination module 114 may be configured to determine a field of view for the virtual space at time T. As illustrated, the determined field of view at time T may be position at a location (X, Y) within the virtual space at a 0 degree rotational position about the axis 208 that runs perpendicular to the virtual space 200 at the location (X, Y) in the virtual space. As so positioned, the field of view, as illustrated by the shaded area within the display 204, may comprise parts of objects 202 at time T as shown.

FIG. 2B illustrates at time T+1, the display 204 may have rotated by α° with respect to the rotational axis 208. The rotation of the display 204 may be detected by any suitable sensor included in or coupled to the system 100 as described above. In this example, the display position module 114 may be configured to determine the rotational degree by which the display has rotated about the rotational axis 208, i.e. a determination of α°. The field of view determination module 114 may be configured to determine, at time T+1, a field of view for the virtual space based on position of the display 204 in the degree of freedom about the axis 208 at time T+1, i.e. positioned at (X,Y) having an α° about the rotational axis 208 as illustrated by the shaded area within the display 204. Based on such position information related to the display 204, the space module 112 may be configured to calculate an adjustment to compensate for the display 204's rotation of α° such that the objects of 202 in the field remain upright in the virtual space regardless of the rotation of the display. As shown, although the positions of the objects in the field of view (shaded area within the display 204) remain fixed as compared to time T, the parts of objects 202 displayed in the field of view have changed as compared to those in the field of view at time T, because the field of view has rotated α° about the rotational axis 208 in the virtual space to correspond to the display's rotation. In this way, the field of view for virtual space varies dynamically between time T and time T+1, while the objects, e.g. the objects 202, in the field of the view are maintained fixed.

FIGS. 3A-B illustrate another example using the system 100 as shown in FIG. 1 to present views of the virtual space in accordance with the disclosure. In this example, the virtual space is a user interface 302 comprising several objects 304, e.g., application icons for software running on a smartphone or tablet. The display 204 in this example has an degree of freedom about an axis 308 through a centroid 306 as illustrated. As shown in FIG. 3-A, at time T, the icons 304 may be positioned, e.g., as determined by the space module 112, upright with a zero rotational angle relative to the axis 308.

FIG. 3B illustrates that at time T+1, as shown, the display 204 has rotated about the rotational axis 308 for X°. As described above, such a rotation may be determined by the display position module 114 based on the display position information received by the system 100. Based on the rotation of display 204 at time T+1, the field of view determination module 116 may be configured to determine a field of view for the interface 302. As shown in this example, the field of view, at time T+1, changes to an angular view of the user interface 302 corresponding to the display 204's rotational position about axis 308 at time T+1. Also as shown, the space module 112 may be configured to adjust view representation of the user interface 302 such that the user interface 302 does not tilt with the display 204 and maintains fixed as compared to its position at time T.

FIGS. 4A-B illustrate another example of using system 100 to present views of a virtual space in accordance with the disclosure. In this example, at time T, as shown in FIG. 4A, based on the position of the display 204 at time T, the space module 112 may be configured to determine a view of the user interface 302 as shown. In FIG. 4B, the display 204 has moved forward according to the arrow 400 at time T+1 along the axis 308 through the centroid 306. As shown, the space module 112 may be configured to adjust the representation of the user interface 302 presented on the display such that the size of the user interface 302 appears smaller at time T+1 than that at time T. As a result, such an adjustment creates a perception that the position of user interface 302 remains fixed despite the movement of the display 204. The smaller user interface 302 at time T+1 as shown creates a depth perception to the user of the display 204 as the display 204 moves forward according to the arrow 400.

FIGS. 5A-B illustrate yet another example of using system 100 to present views of a virtual space to a user in accordance with the disclosure. In this example, as shown, the two-dimensional virtual space 500 simulates a virtual racing game world comprising objects 504 depicting a virtual race track. In this example, the display 204 has a rotational degree of freedom about an axis 512 through a centroid 510 of the display 204. FIG. 5A illustrates, at time T, the space module 112 may be configured to determine a view of the virtual space based on the display 204's position at time T. At time T, as illustrated, a circle shape object 504 represents an obstacle in the middle of the virtual race track appears in the field of view (shaded area). As shown, the virtual space 500 in this example also comprises a truck 506 that may be controlled by a user. At time T, the truck 506 is traveling at a speed towards a direction as indicated by the arrow 508. As described above, the field of view determination module 116 may be configured to determine the field of view in the virtual space, at time T, based on the display 502's position and dimension, as illustrated by the shaded area within the display 204.

In this example, as shown, in response to the appearance of the circle shaped object 504 in the middle of the race track at time T, the user may tilt the display 502 to his/her left to help the truck 506 avoid the circle shaped object 504. FIG. 5B illustrates, at time T+1, the display 204 has been tilted to the left. In so tilting, the display position module 114 may be configured to determine a rotational direction of the display 204 during the rotation. The determined rotational direction may then be sent to the object control module 116, which, as described above, may be configured to calculate a direction change for the truck 506. As shown, the object control module 116 may be configured to instruct a direction change of truck 506 at time T+1—i.e. the truck 506 moves in a direction as indicated by the arrow 508 in FIG. 5B. Notice the direction difference for the arrows 508 in FIG. 5A-B. This difference indicates a directional change of the truck 506 as a result of the tilting of the display 204. However, as the display 204 tilts and truck 506 changes it direction in the virtual space, the positions of objects 204 in the field of view are maintained fixed between time T and time T+1. As described above, the space module 112 may be configured to calculate an adjustment to compensate for the display 204's tilting in order to keep the objects at the same positions in the field of the view for the virtual space. In this manner, the field of view between time T and T+1 has changed to account for the display 204's position change—i.e., the field of view in the virtual space shown in the display 204 has changed between time T and T+1. However, the position of objects 504 in the virtual are maintained unchanged in the field of view between time T and T+1. This creates a realistic driving experience for the user such that the display 204 may be used as a steering wheel that may change the direction of the truck 506 but not the orientation and position of the race track and other objects 504 in the virtual space. This closely resembles the real-world driving experience using a steering wheel.

Figure 6:
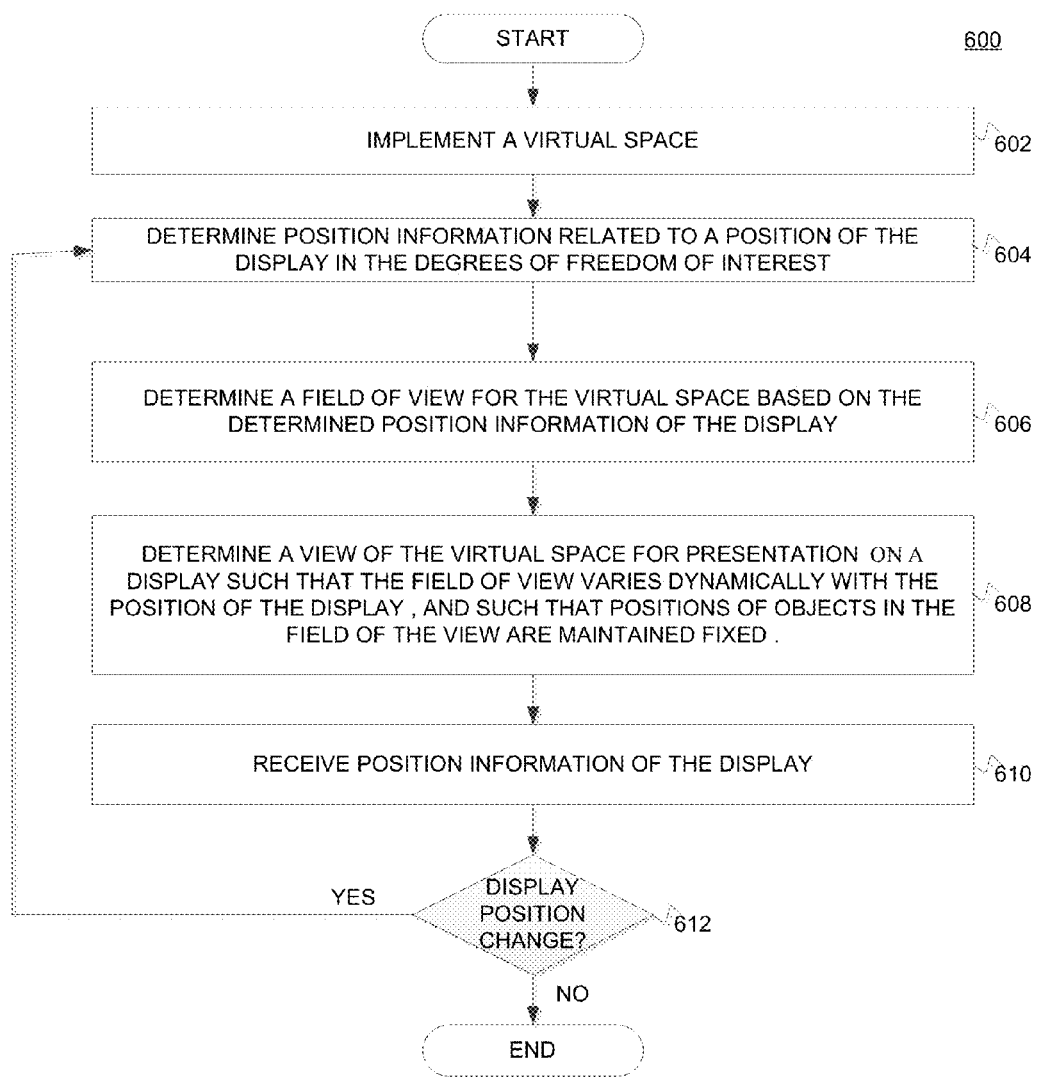
FIG. 6 illustrates one example of a method of presenting views of virtual space in accordance with one embodiment of the disclosure.

FIG. 6 illustrates an example of method 600 for presenting views of a virtual space in accordance with the disclosure. It will be described with a reference to FIG. 1. As shown, at block 602, in operation, the method may implement a virtual space. As described above, a virtual space may comprise one or more objects. For example, the space module 112 may be configured to determine representation information including positions of objects in the virtual space.

At block 604, in operation, the method may determine poison information related to a position of the display in the degree(s) of freedom of interest. As described above, the display position module 114 may be configured to determine such information based on the display's position, for example, detected by position determination device. In some implementations, to achieve this, the display position module 114 may be configured to translate the display position information received and/or generated by the position determination device to information indicating the display's position with respect to the degree(s) of freedom of interest.

At block 606, in operation, the method may determine a field of view for a virtual space for a display based on the position information of the display. As described above, the field of view determination module 116 may be configured to determine a field of view based on the position information of the display in the degrees of freedom as determined by the display position module 114. As also described above, the field of view in the virtual space may comprise representations of the virtual space based on the display's position and dimension.

At block 608, in operation, the method may determine a view of the virtual space for presentation on the display such that the field of view varies dynamically with the position of the display in the degree(s) of freedom, and such that positions of objects in the field of the view are maintained fixed. As described above, the space module 112 may be configured to determine a view of the virtual space based on the field of view. At different display position in the degree(s) of freedom of interest, the field of view may vary dynamically—for example, certain objects in the virtual space may appear in the field at one display position but not at another display position. The size, shape, display angles, motion and/or any other physical characteristics of the objects may be presented differently in the field of view as the display position changes. However, as the field of so varies with the position of the display, the positions of the object in the field of view are maintained fixed. For example, as described above, in the case where the display has the freedom to rotate about an axis perpendicular to the two-dimensional plane parallel to the display, the objects in the field of view does not follow the display's rotation and maintain fixed within the field of view when they appear in the field of view. In some implementations, to achieve this, the space module 112 may be configured to calculate an adjustment to compensate for the position change of the display in the degree(s) of freedom. This adjustment may be used by the space module 112 to maintain the positions of objects fixed with respect to the two-dimensional plane as the display changes its position with respect to the two-dimensional plane.

At block 610, in operation, the method may receive position information regarding the display. As described earlier, such position information may be detected by sensors. In some implementations, the display position module 114 may be configured to determine a position change for the display within the two-dimensional plane as described above. At decision block 612, the method recognizes whether there is display position change. In some examples, the method recognizes there is such a change, e.g., as determined by the display position module 114, and proceed back to operation 602 to repeat operations 602-608 as described above. In some other examples, the method recognizes there is no such a change and proceeds to the end.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to present a view of a virtual space based on a position of a display, the system comprising:
one or more physical processors configured by machine-readable instructions to perform the following operations:
provide a virtual space by executing an instance of the virtual space, and implementing the instance of the virtual space to determine a view of the virtual space for presentation on the display;
determine position information specifying a position of the display in a first rotational degree of freedom in the real world about an axis through a centroid of the display that runs perpendicular to the display;
determine a field of view in the virtual space based on the determined position information of the display such that the position of the field of view in the virtual space in the first rotational degree of freedom in the virtual space corresponds to the position of the display in the first rotational degree of freedom in the real world, the first rotational degree of freedom in the virtual space specifying rotation in the virtual space about the same axis through the centroid of the display that runs perpendicular to the display, the field of view in the virtual space in the first rotational degree of freedom in the virtual space being determined without regard for motion or position of the display in any translational degree of freedom and without regard for motion or position of the display in any other rotational degree of freedom in the real world; and
selectively control movement of an object in the virtual space within the field of view based on the position of the display in the first rotational degree of freedom in the real world.

2. The system of claim 1, wherein the one or more processors are further configured by machine-readable instructions such that shifting of the field of view leaves relative positions between objects in the virtual space unchanged.

3. The system of claim 1, wherein the one or more processors are further configured by machine-readable instructions such that the field of view is centered on the selectively controlled object.

4. The system of claim 1, wherein the selectively controlled object includes a character associated with a user.

5. The system of claim 1, wherein the view of virtual space is presented without images of the real world.

6. The system of claim 1, wherein the one or more processors are further configured by machine-readable instructions to determine the field of view in the virtual space based on the determined position of the display in the first rotational degree of freedom in real time or near real time.

7. The system of claim 1, wherein selectively controlling movement of the object in the virtual space within the field of view based on the determined position information related to the position of the display in the first rotational degree of freedom in the real world comprises controlling movement with respect to the first degree of freedom in the virtual space.

8. The system of claim 1, wherein the one or more physical processors are further configured by machine-readable instructions to selectively control movement of the object in the virtual space within the field of view further based on the determined position information related to the position of the display in a second degree of freedom in the real world.

9. A computer-implemented method to present a view of a virtual space based on a position of a display, the method being performed in a computer system comprising one or more processors and storage media storing machine-readable instructions, the method comprising:
implementing an instance of the virtual space to determine a view of the virtual space for presentation on the display;
determining position information specifying a position of the display in a first rotational degree of freedom in the real world about an axis through a centroid of the display that runs perpendicular to the display;
determining a field of view in the virtual space based on the determined position information of the display such that the position of the field of view in the virtual space in the first rotational degree of freedom in the virtual space corresponds to the position of the display in the first rotational degree of freedom in the real world, the first rotational degree of freedom in the virtual space describing rotation in the virtual space about the same axis through the centroid of the display that runs perpendicular to the display, the field of view in the virtual space in the first rotational degree of freedom in the virtual space being determined without regard for motion or position of the display in any translational degree of freedom and without regard for motion or position of the display in any other rotational degree of freedom in the real world; and
selectively controlling movement of an object in the virtual space within the field of view based on the position of the display in the first rotational degree of freedom in the real world.

10. The computer-implemented method of claim 9, wherein shifting of the field of view leaves relative positions between objects in the virtual space unchanged.

11. The computer-implemented method of claim 9, wherein the field of view is centered on the selectively controlled object.

12. The computer-implemented method of claim 9, wherein the selectively controlled object includes a character associated with a user.

13. The computer-implemented method of claim 9, wherein the view of virtual space is presented without images of the real world.

14. The computer-implemented method of claim 9, wherein the determination of the field of view in the virtual space is based on the determined position of the display in the first rotational degree of freedom in real time or near real time.

15. The method of claim 9, wherein selectively controlling movement of the object in the virtual space within the field of view based on the determined position information related to the position of the display in the first rotational degree of freedom in the real world comprises controlling movement with respect to the first degree of freedom in the virtual space.

16. The method of claim 9, further comprising selectively controlling movement of the object in the virtual space within the field of view further based on the determined position information related to the position of the display in a second degree of freedom in the real world.

\* \* \* \* \*